(12) United States Patent
Lei et al.

(10) Patent No.: US 10,502,889 B2
(45) Date of Patent: Dec. 10, 2019

(54) BACKLIGHT UNIT

(71) Applicant: WUHAN CHINA STAR OPTOELECTRONICS TECHNOLOGY CO., LTD, Wuhan, Hubei (CN)

(72) Inventors: Huazhu Lei, Hubei (CN); Gege Zhou, Hubei (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 0 days.

(21) Appl. No.: 15/577,896

(22) PCT Filed: Jul. 24, 2017

(86) PCT No.: PCT/CN2017/094143
§ 371 (c)(1),
(2) Date: Nov. 29, 2017

(87) PCT Pub. No.: WO2019/000524
PCT Pub. Date: Jan. 3, 2019

(65) Prior Publication Data
US 2019/0004243 A1    Jan. 3, 2019

(30) Foreign Application Priority Data

Jun. 30, 2017  (CN) .......................... 2017 1 0522116

(51) Int. Cl.
*G02B 6/00* (2006.01)
*F21V 8/00* (2006.01)
*G02F 1/1333* (2006.01)

(52) U.S. Cl.
CPC ........... *G02B 6/0085* (2013.01); *G02B 6/009* (2013.01); *G02F 1/133308* (2013.01); *G02B 6/0055* (2013.01); *G02F 2001/133317* (2013.01)

(58) Field of Classification Search
CPC .... G02B 6/0085; G02B 6/009; G02B 6/0055; G02F 2001/133317
See application file for complete search history.

(56) References Cited

U.S. PATENT DOCUMENTS

| 9,316,774 B2* | 4/2016 | Kim ..................... G02B 6/0085 |
| 2014/0043855 A1* | 2/2014 | Kang ..................... G02B 6/009 |
| | | 362/612 |

(Continued)

FOREIGN PATENT DOCUMENTS

| CN | 101500373 A | 8/2009 |
| CN | 201487705 U | 5/2010 |

(Continued)

*Primary Examiner* — Anabel Ton
(74) *Attorney, Agent, or Firm* — Mintz Levin Cohn Ferris Glovsky and Popeo, P.C.; Jhongwoo Peck

(57) ABSTRACT

The present invention provides a backlight unit including: a middle frame, a reflector disposed in the middle frame, a light guide plate provided on a surface of the reflector, and an LED light strip disposed at one side of the middle frame and opposite to a side edge of the light guide plate. The middle frame is formed with a heat radiating plate corresponding to the reflector and attached to a surface of the reflector at one side thereof. The heat radiating plate includes a heat radiating layer, a first cover layer and a second cover layer at two sides of the heat radiating layer. The first cover layer is opposite to the reflector, and the first cover layer is provided with a first notch for contacting a circuit board with the heat radiating layer at one side thereof adjacent to the LED light strip.

14 Claims, 8 Drawing Sheets

(56) References Cited

U.S. PATENT DOCUMENTS

| | | | |
|---|---|---|---|
| 2014/0226080 A1* | 8/2014 | Tomomasa | G02B 6/0085 348/794 |
| 2015/0177448 A1* | 6/2015 | Yu | G02B 6/0085 362/606 |
| 2018/0173044 A1* | 6/2018 | Lim | G02F 1/133308 |
| 2018/0275337 A1* | 9/2018 | Xie | G02B 6/0085 |

FOREIGN PATENT DOCUMENTS

| CN | 103727467 A | 4/2014 |
|---|---|---|
| CN | 104832837 A | 8/2015 |
| CN | 205213232 U | 5/2016 |

\* cited by examiner

BACKLIGHT UNIT

CROSS-REFERENCES TO RELATED APPLICATIONS

This application is a U.S. national phase application, pursuant to 35 U.S.C. § 371, of PCT/CN2017/094143, filed Jul. 24, 2017, designating the United States, which claims priority to Chinese Application No. 201710522116.5, filed Jun. 30, 2017. The entire contents of the aforementioned patent applications are incorporated herein by this reference.

TECHNICAL FIELD

The present application generally relates to liquid crystal displays, and more particularly, relates to a backlight unit.

BACKGROUND ART

At present, intelligent display terminals are generally liquid crystal display modules having high-resolution and high-brightness which will undoubtedly use a backlight unite (BLU) having higher brightness. Based on the present brightness level of LEDs, more LEDs or dual-crystal LEDs are used in a backlight unit to improve brightness. As the number of LED chips in a single backlight unite increases, the thermal power consumption will increases accordingly. How to solve the problem of LED heat is a topic worthy of study.

SUMMARY

One object of the present application is to provide a backlight unit which can improve the heat dissipation efficiency of the backlight unit.

According to one embodiment of the present invention, a backlight unit includes a middle frame, a reflector disposed in the middle frame, a light guide plate provided on a surface of the reflector, and an LED light strip disposed at one side of the middle frame and opposite to a side edge of the light guide plate. The middle frame is formed with a heat radiating plate corresponding to the reflector and attached to a surface of the reflector at one side thereof. The heat radiating plate includes a heat radiating layer, a first cover layer and a second cover layer at two sides of the heat radiating layer. The first cover layer is opposite to the reflector, and the first cover layer is provided with a first notch for contacting a circuit board with the heat radiating layer at one side thereof adjacent to the LED light strip.

Preferably, the first notch causes the heat radiating layer to be exposed to form an exposed portion, and the circuit board and the exposed portion are attached to each other.

Preferably, the second cover layer is provided with a first extension portion opposite to the LED light strip, and the first extension portion is attached to the middle frame.

Preferably, a filling portion for filling the first notch and being connected to the heat radiating layer is disposed in the first notch, the heat radiating layer is formed in an L-shape, and the filling portion and the circuit board are attached to each other.

Preferably, the filling portion completely fills the first notch.

Preferably, the filling portion partially fills the first notch, the second cover layer forms a contact portion at an edge thereof adjacent to the LED light strip, and the contact portion and the middle frame are attached to each other.

Preferably, the filling portion and the radiating layer are made from same material.

Preferably, a surface of the filling portion is flush with a surface of the first cover layer opposite to the reflector.

Preferably, the heat radiating layer is made from graphite material.

Preferably, the middle frame defines a second notch at one edge thereof adjacent to the LED light strip.

Compared with the prior art, the heat radiating plate according to the present invention is provided with a notch for contacting the heat radiating layer with the LED light strip, the thermal resistance between the radiating layer and the LED light strip is reduced, and the heat dissipation efficiency of the backlight unit is improved.

DETAILED DESCRIPTION OF EXEMPLARY EMBODIMENTS

Figure 1:
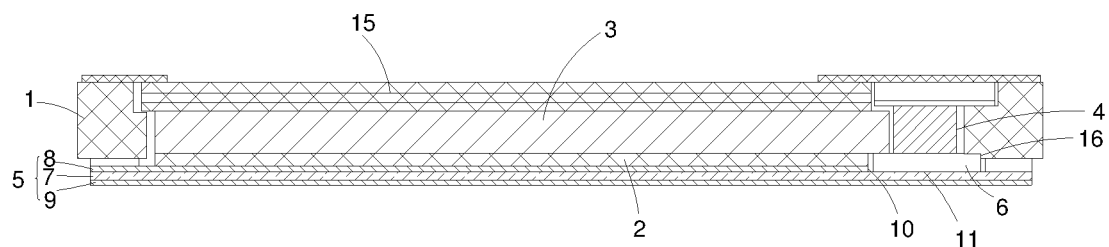
FIG. 1 depicts a cross-sectional view of a backlight unit according to a first embodiment of the present application.

The present invention will be described in more detail with reference to the accompanying drawings and embodiments.

Referring to FIGS. 1, 4, 7 and 10, the backlight unit according to the present invention includes a middle frame 1; a reflector 2, a light guide plate 3 and an optical film group 15 arranged in the middle frame 1 in turn from bottom to top; and an LED light strip 4 opposite to one side of the light guide plate 3. According to one embodiment of the present invention, the assembly method of the backlight unit can be the same as that of the conventional backlight units, and will not be detailed in the present application.

It should be noted that, according one embodiment of the present invention, a heat radiating plate 5 opposite to the reflector 2 is arranged at one side of the middle frame 1. A circuit board 6 of the LED light strip 4 is disposed opposite to the heat radiating plate 5.

The heat radiating plate 5 includes a heat radiating layer 7 and a first cover layer 8 and a second cover layer 9 provided on two sides of the heat radiating layer 7. The first cover layer 8 is disposed opposite to the the reflector 2 and attached to the reflector 2. A first notch 10 corresponding to the LED strip 4 for bringing the circuit board 6 into contact with the heat radiating layer 7 is provided on the first cover layer 8. The circuit board 6 of the LED light strip 4 is directly attached to the heat radiating layer 7, so that the heat emitted by the LED light strip 4 can be transferred to the heat radiating layer 7 directly, thereby reducing the thermal resistance and improving the heat dissipation efficiency.

According to one embodiment of the present invention, the heat radiating layer 7 is made from graphite material. More specifically, the heat radiating layer 7 is composed of graphite heat sink made from graphite material. The thickness of the heat radiating layer 7 can be adjusted according to the heat radiating requirement, and will not be detailed in this application.

Figure 2:
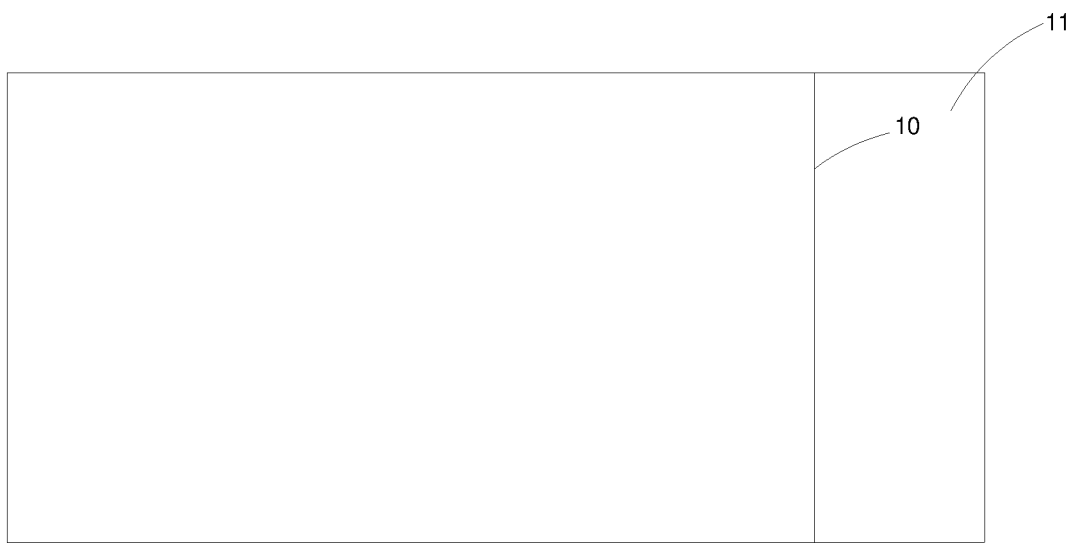
FIG. 2 depicts a top view of a heat radiating plate according to the first embodiment of the present application.
Figure 3:
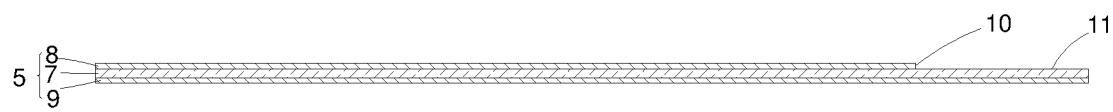
FIG. 3 depicts a cross-sectional view of a heat radiating plate according to the first embodiment of the present application.

Referring to FIGS. 2 and 3, in the heat radiating plate according to the first embodiment of the present invention, the first notch 10 causes the heat radiating layer 7 to be exposed to form an exposed portion 11, so that the heat radiating plate 5 forms a step structure at one side thereof adjacent to the LED light strip 4. In the illustrated embodiment, the step structure has two steps.

Referring to FIG. 1, when the heat radiating plate 5 and the middle frame 1 are assembled, the exposed portion 11 are attached to the surfaces of the circuit board 6 and the middle frame 1, respectively. The surfaces of the first cover layer 8 and the reflector 2 are attached to each other. The heat radiating plate 5 is fixed to the middle frame 1 via existing paste technology generally available to one skilled in the art, such as back glue, and will not be detailed in the present application.

Figure 5:
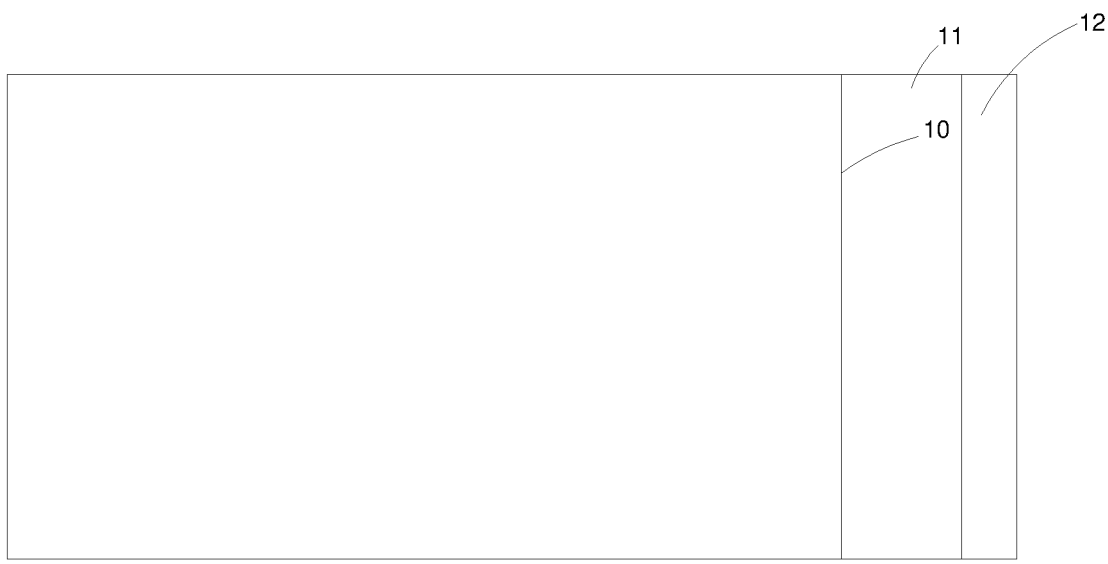
FIG. 5 depicts a top view of a heat radiating plate according to the second embodiment of the present application.
Figure 6:
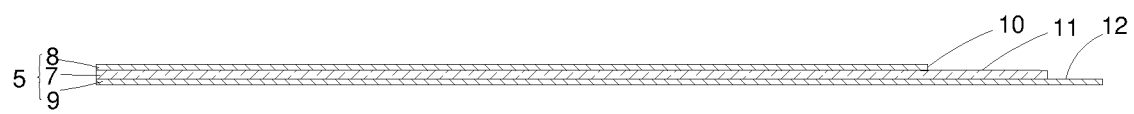
FIG. 6 depicts a cross-sectional view of a heat radiating plate according to the second embodiment of the present application.

Referring to FIGS. 5 and 6, according to the second embodiment of the present invention, the first notch 10 causes the heat radiating layer 7 to be exposed to form an exposed portion 11. The second cover layer 9 is provided with a first extension portion 12 corresponding to the LED light strip 4 to form a step structure having three steps. The first extension portion 12 is configured for fixing with the middle frame 1, the exposed portion 11 is configured for fitting with the circuit board 6.

Figure 4:
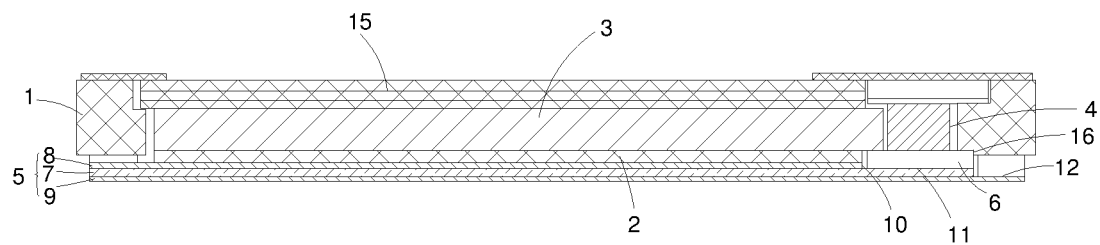
FIG. 4 depicts a cross-sectional view of a backlight unit according to a second embodiment of the present application.

Referring to FIG. 4, in the second embodiment of the present invention, when the heat radiating plate 5 and the middle frame 1 are assembled, the first extension portion 12 and the surface of the middle frame 1 are attached to each other, the surface of the first cover layer 8 and the reflector 2 are attached to each other, and the circuit board 6 of the LED light strip 4 is attached to the exposed portion 11. In this way, the heat is radiated sufficiently and the heat radiating plate 5 can be fixed well. The heat radiating layer 7 does not need to be fixed, so that the overall thickness of the backlight unit can be reduced further.

Figure 8:
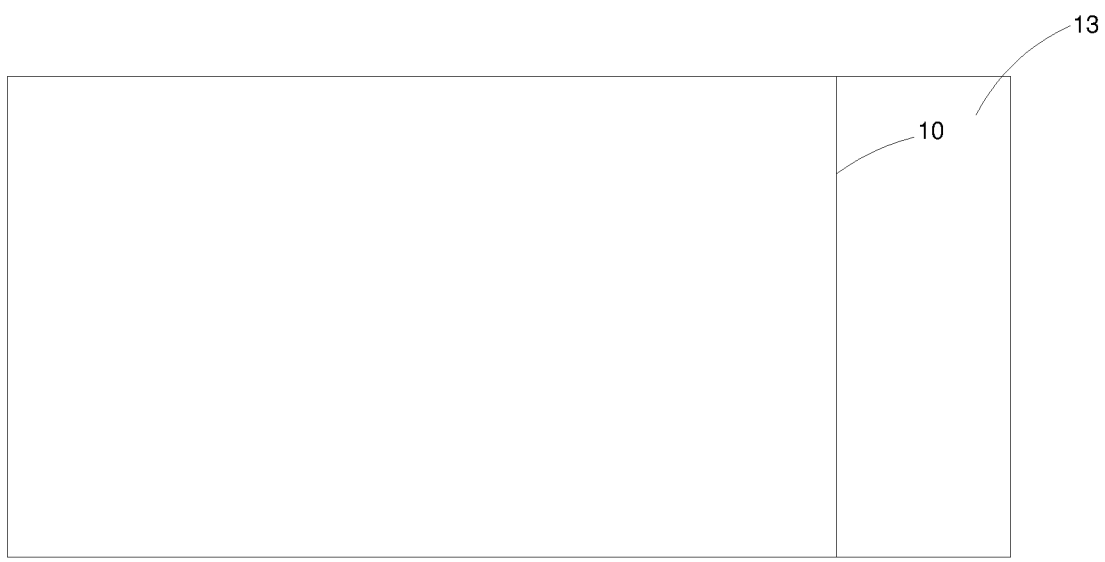
FIG. 8 depicts a top view of a heat radiating plate according to the third embodiment of the present application.
Figure 9:
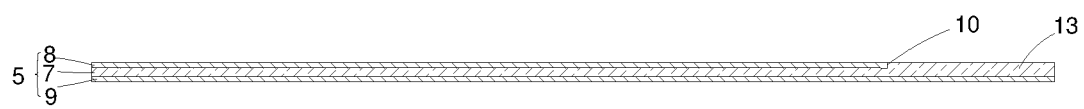
FIG. 9 depicts a cross-sectional view of a heat radiating plate according to the third embodiment of the present application.

Referring to FIGS. 8 and 9, a filling portion 13 capable of filling the first notch 10 and being connected to the heat radiating layer 7 is disposed in the first notch 10, so that the heat radiating layer 7 can be formed in an L-shape. The filling portion 13 and the circuit board 6 are attached to each other, and the filling portion 13 can be filled in two different filling manners.

Referring to FIGS. 8 and 9, according to the third embodiment of the present invention, the filling portion 13 completely fills the first notch 10, the circuit board 6 is arranged on the surface of the filling portion 13, the edge of the filling portion 13 is flush with the edge of the second cover layer 9 at one side of the LED light strip 4. The surface of the filling portion 13 is flush with the surface of the first cover layer 8 opposite to the reflector 2.

Figure 7:
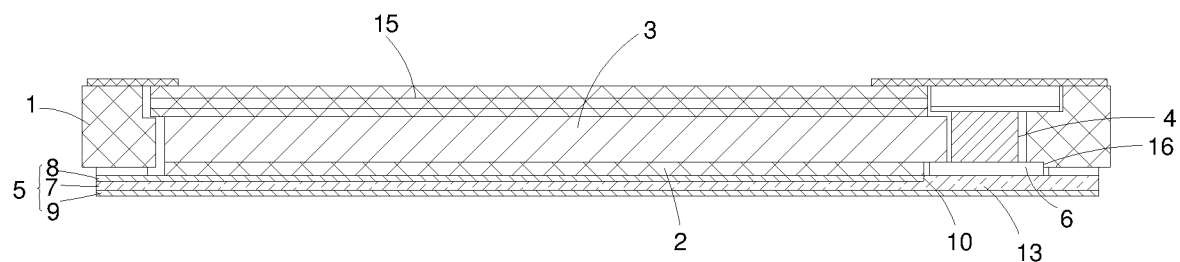
FIG. 7 depicts a cross-sectional view of a backlight unit according to a third embodiment of the present application.

Referring to FIG. 7, according to the third embodiment of the present invention, when the heat radiating plate 5 and the middle frame 1 are assembled, the surface of the filling portion 13 and the surface of the middle frame 1 are attached to each other, the surface of the first cover layer 8 and the reflector 2 are attached to each other, the circuit board 6 of the LED light strip 4 and the surface of the filling portion 13 are attached and fixed to each other. The heat radiating plate 5 is fixed to the middle frame 1 via existing paste technology generally available to one skilled in the art, such as back glue, and will not be detailed in the present application.

Figure 11:
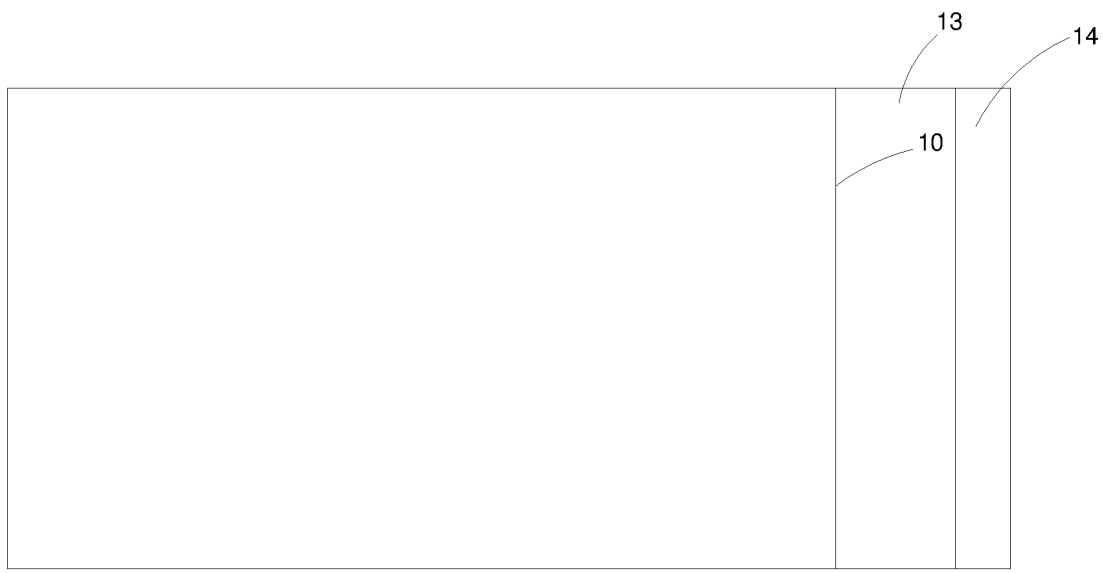
FIG. 11 depicts a top view of a heat radiating plate according to the fourth embodiment of the present application.
Figure 12:
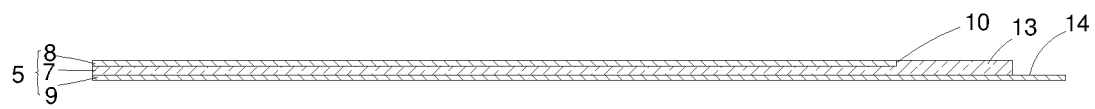
FIG. 12 depicts a cross-sectional view of a heat radiating plate according to the fourth embodiment of the present application.

Referring to FIGS. 11 and 12, according to the fourth embodiment of the present invention, the filling portion 13 partially fills the first notch 10, so that the second cover layer 9 forms a contact portion 14 at an edge thereof adjacent to the LED light strip 4. The width of the filling portion 13 is less than the width of the first notch 10. The surface of the filling portion 13 is flush with the surface of the first cover layer 8 opposite to the reflector 2.

Figure 10:
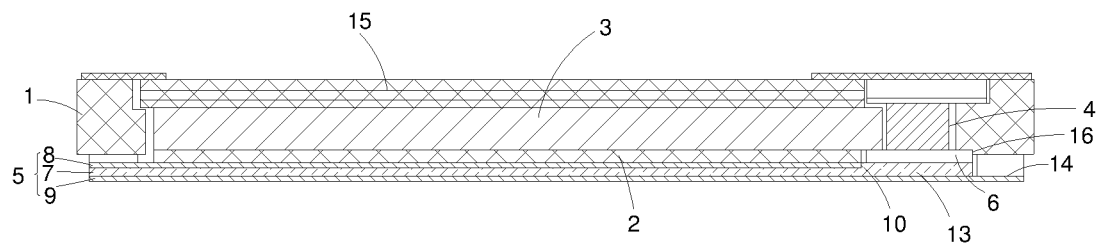
FIG. 10 depicts a cross-sectional view of a backlight unit according to a fourth embodiment of the present application.

Referring to FIG. 10, according to the fourth embodiment of the present invention, when the heat radiating plate 5 and the middle frame 1 are assembled, the surface of the filling portion 13 is fixed to the circuit board 6 of the LED light strip 4, and the middle frame 1 is attached to the the contact portion 14. The heat radiating plate 5 is fixed to the middle frame 1 via existing paste technology generally available to one skilled in the art, such as back glue, and will not be detailed in the present application.

In the third embodiment and the fourth embodiment of the present invention, the filling portion 13 and the heat radiating layer 7 are made from same materials. The filling portion 13 is integrally formed with the heat radiating layer 7. The filling portion 13 is configured to transfer the heat to the heat radiating layer 7 and further radiate the heat via the heat radiating layer 7, so as to improve the heat dissipation efficiency.

In the present invention, as shown in FIGS. 1, 4, 7 and 10, the middle frame 1 is provided with a second notch 16 at an edge thereof adjacent to the LED light strip 4. The second notch 16 is configured to position the circuit board 6. The circuit board 6 is pressed by one edge of the LED light strip 4 adjacent to the light guide plate 3, so as to limit the position of the circuit board 6. The circuit board 6 and the heat radiating layer 7 can be completely attached to each other, to further improve the heat dissipation efficiency.

It should be understood that, the above embodiment is only used to illustrate the technical concept and feature of the present invention, and the purpose thereof is familiarize the person skilled in the art to understand the content of the present invention and carry it out, which cannot restrict the protection scope of the present invention based on above. Any equivalent transformation or modification made in the spirit of the present invention should all be included within the protection scope of the present invention.

What is claimed:
1. A backlight unit comprising:
    a middle frame;
    a reflector disposed in the middle frame;
    a light guide plate provided on a surface of the reflector; and an LED light strip disposed at one side of the middle frame and opposite to a side edge of the light guide plate, wherein the middle frame is formed with a heat radiating plate corresponding to the reflector and attached to a surface of the reflector at one side thereof, wherein the heat radiating plate comprises a heat radiating layer, a first cover layer and a second cover layer at two sides of the heat radiating layer, the first cover layer is opposite to the reflector, and the first cover layer is provided with a first notch for contacting a circuit board with the heat radiating layer at one side thereof adjacent to the LED light strip, and wherein the first notch causes the heat radiating layer to be exposed to form an exposed portion, and the circuit board and the exposed portion are attached to each other.

2. The backlight unit according to claim 1, wherein the second cover layer is provided with a first extension portion opposite to the LED light strip, and the first extension portion is attached to the middle frame.

3. The backlight unit according to claim 1, wherein the second cover layer is provided with a first extension portion opposite to the LED light strip, and the first extension portion is attached to the middle frame.

4. The backlight unit according to claim 1, wherein a filling portion for filling the first notch and being connected to the heat radiating layer is disposed in the first notch, the heat radiating layer is formed in an L-shape, and the filling portion and the circuit board are attached to each other.

5. The backlight unit according to claim 3, wherein the filling portion completely fills the first notch.

6. The backlight unit according to claim 3, wherein the filling portion partially fills the first notch, the second cover layer forms a contact portion at an edge thereof adjacent to the LED light strip, and the contact portion and the middle frame are attached to each other.

7. The backlight unit according to claim 4, wherein the filling portion and the radiating layer are made from same material.

8. The backlight unit according to claim 5, wherein the filling portion and the radiating layer are made from same material.

9. The backlight unit according to claim 6, wherein the filling portion and the radiating layer are made from same material.

10. The backlight unit according to claim 7, wherein a surface of the filling portion is flush with a surface of the first cover layer opposite to the reflector.

11. The backlight unit according to claim 8, wherein a surface of the filling portion is flush with a surface of the first cover layer opposite to the reflector.

12. The backlight unit according to claim 9, wherein a surface of the filling portion is flush with a surface of the first cover layer opposite to the reflector.

13. The backlight unit according to claim 1, wherein the heat radiating layer is made from graphite material.

14. The backlight unit according to claim 1, wherein the middle frame defines a second notch at one edge thereof adjacent to the LED light strip.

* * * * *